United States Patent [19]
Chiu

[11] Patent Number: 5,681,188
[45] Date of Patent: Oct. 28, 1997

[54] ELECTRICAL CONNECTOR

[75] Inventor: Chin-Te Chiu, Pan-Chiao, China

[73] Assignee: Cheng Uei Plastic Component Corp., Taipei Hsien, Taiwan

[21] Appl. No.: 696,215

[22] Filed: Aug. 13, 1996

[51] Int. Cl.$^6$ ................................................. H01R 13/405
[52] U.S. Cl. ........................ 439/736; 439/276; 439/601; 439/936
[58] Field of Search .................................. 439/604, 736, 439/936, 276, 606

[56] References Cited

U.S. PATENT DOCUMENTS

| | | | |
|---|---|---|---|
| 3,963,295 | 6/1976 | Askman et al. | 439/276 |
| 3,970,352 | 7/1976 | Dorrell et al. | 439/276 |
| 4,114,008 | 9/1978 | Luetzow | 439/736 |
| 4,820,196 | 4/1989 | Roselle et al. | 439/936 |
| 5,590,463 | 1/1997 | Feldman et al. | 439/736 |

*Primary Examiner*—J. J. Swann
*Attorney, Agent, or Firm*—Bacon & Thomas

[57] ABSTRACT

An electrical connector including a plastic base frame having a plurality of terminal insertion holes, a plurality of terminals respectively inserted into the terminal insertion holes and mounted in the base frame and respectively welded to a cable, a metal cover shell covered on the base frame, and a packing plastic molded on the base frame in flush with the metal cover shell and covered over the terminals and one end of the cable, wherein the base frame has a plurality of flexible projecting strips respectively extended from the periphery of the terminal insertion holes toward the cable and embedded in the packing plastic, the flexible projecting strips being deformed by heat to block up one end of the terminal insertion holes during the molding of the packing plastic; the metal cover shell has filling holes corresponding to the flexible projecting strips for the filling of the sealing plastic fluid.

2 Claims, 4 Drawing Sheets

ELECTRICAL CONNECTOR

BACKGROUND OF THE INVENTION

The present invention relates to electrical connectors, and relates more particularly to such an electrical connector which prohibits sealing plastic fluid from passing to the inside of the terminal insertion holes thereof during the molding of the packing plastic.

FIG. 1 shows a prior art electrical connector to which the present invention pertains. This structure of electrical connector comprises a plastic base frame having a plurality of terminal insertion holes, a plurality of terminals inserted into the terminal insertion holes and mounted in the plastic base frame and connected to a cable, a metal cover shell covered on the base frame, and a packing plastic molded on the base frame in flush with the metal cover shell to hold down the terminals and the metal cover shell. As indicated in FIG. 2, the terminals are inserted into the terminal insertion holes, the packing plastic is covered on the base frame over the terminals and one end of the cable (see the imaginary line), and a resin core is molded inside the packing plastic (see the dotted lined line). This structure of electrical connector has drawbacks. Because of the limitations of the molding apparatus, the inner diameter of the terminal insertion holes does not perfectly fit the outer diameter of the terminals. Therefore, gaps exist in the terminal insertion holes after the installation of the terminals. During the injection molding process of the packing plastic, the sealing plastic fluid tends to pass through the gaps in the terminal insertion holes to the coupling portions (see the raised portion of the dotted line in FIG. 2) of the terminals. When the sealing plastic fluid passes to the coupling portions of the terminals, it destroys the sense of beauty of the electrical connector. Furthermore, the presence of the sealing plastic around the coupling portions of the terminals may interfere with the connection of the terminals of a matched male electrical connector, causing a contact error. In order to eliminate these problems, the excessively protruded sealing plastic must be removed. However, it is not easy to remove the excessively protruded sealing plastic, because it is disposed inside the metal cover shell.

SUMMARY OF THE INVENTION

The present invention has been accomplished to provide an electrical connector which eliminates the aforesaid drawbacks. According to one aspect of the present invention, the base frame has a plurality of flexible projecting strips respectively extended from the periphery of the terminal insertion holes toward the cable and embedded in the packing plastic. The flexible projecting strips will be deformed by heat to block up one end of the terminal insertion holes during the molding of the packing plastic. Therefore, sealing plastic fluid is prohibited from passing to the inside of the terminal insertion holes. According to another aspect of the present invention, the metal cover shell has filling holes corresponding to the flexible projecting strips for the filling of the sealing plastic fluid.

DETAILED DESCRIPTION OF THE PREFERRED EMBODIMENT

Figure 3:
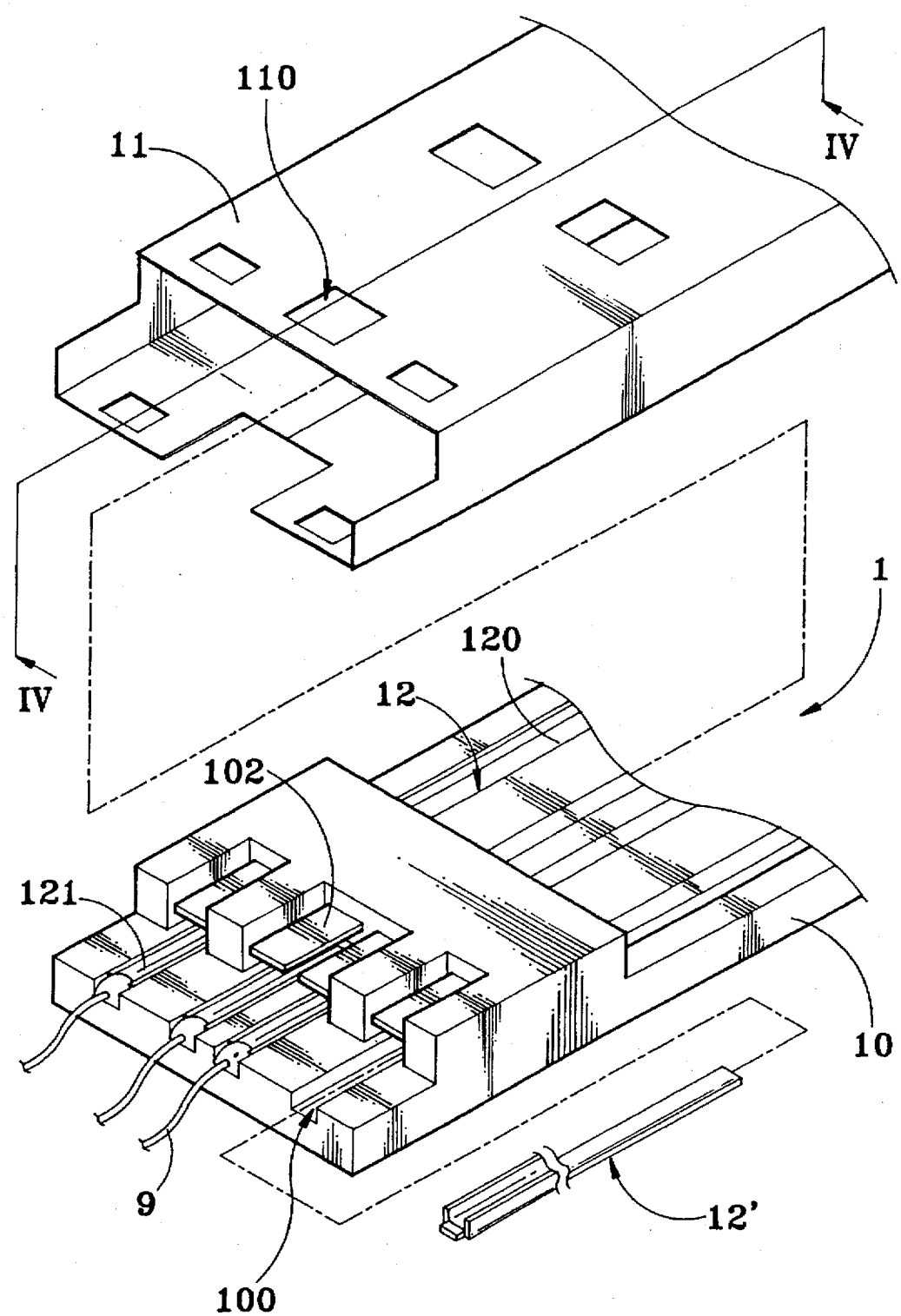
FIG. 3 is an exploded view of an electrical connector according to the present invention.

Referring to FIG. 3, an electrical connector 1 in accordance with the present invention is generally comprised of a base frame 10, a plurality of terminals 12, 12' mounted in the base frame 10, and a metal cover shell 11 covered on the base frame 10 to hold the terminals 12, 12' in place. The base frame 10 is molded from plastic, comprising a plurality of terminal grooves 100 adapted for receiving the terminals 12, 12' respectively, and a plurality of terminal insertion holes 101 (see FIG. 4) through which the terminals 12, 12' are respectively inserted into position. The terminals 12, 12' are respectively mounted in the terminal grooves 100, each having a coupling portion 120 at one end adapted for connecting to a matched electrical male connector, and a connecting portion 121 at an opposite end respectively welded to a cable 9. The base frame 10 further comprises a plurality of flexible projecting strips 102 respectively extended from the periphery of the terminal insertion holes 101 toward the connecting portions 121 of the terminals 12, 12', and adapted for bending downwards to block up the terminal insertion holes 101. The metal cover shell 11 has a plurality of filling holes 110 corresponding to the projecting strips 102 of the base frame 10.

Figure 1:
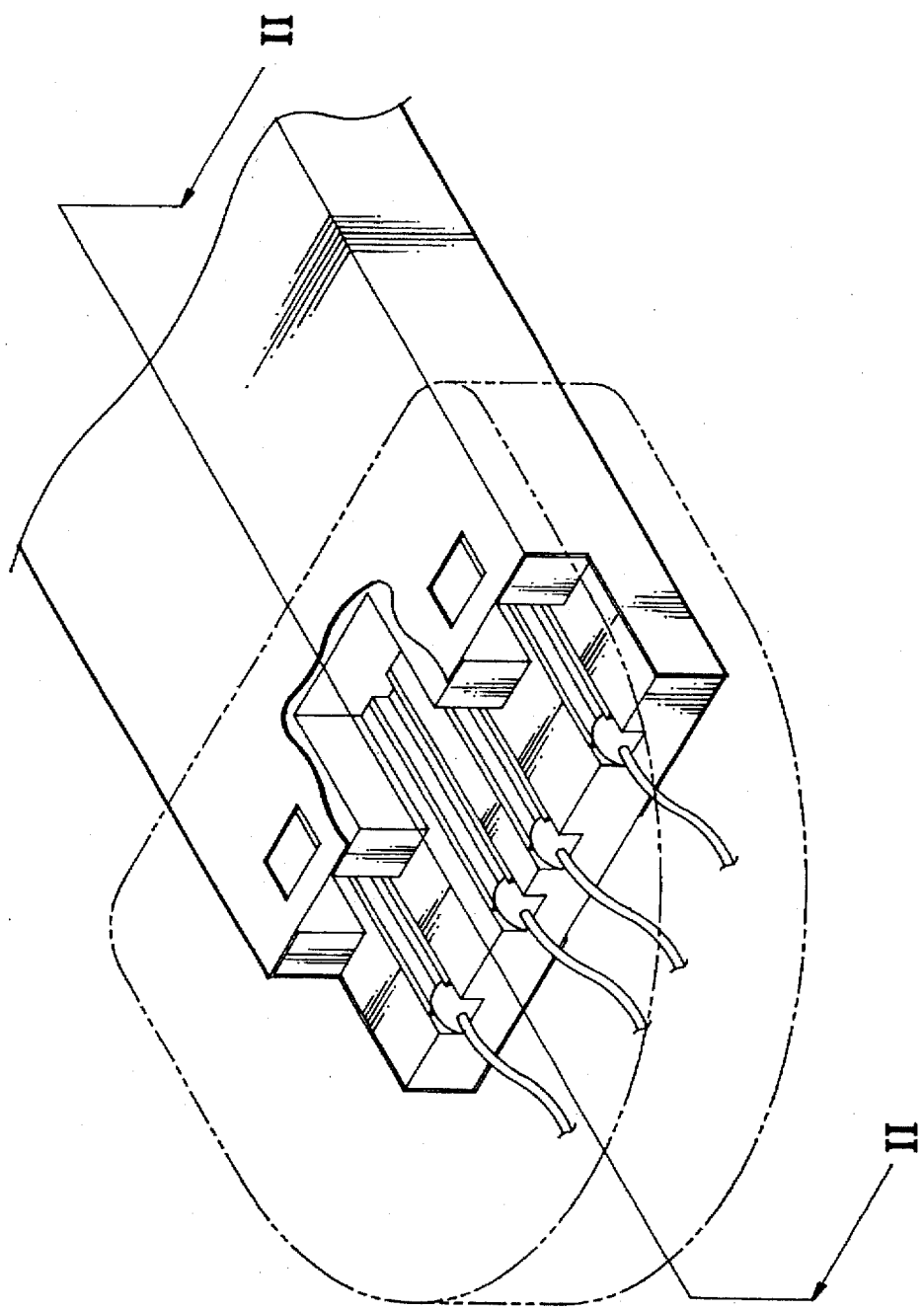
FIG. 1 is a perspective view of an electrical connector according to the prior art.
Figure 2:
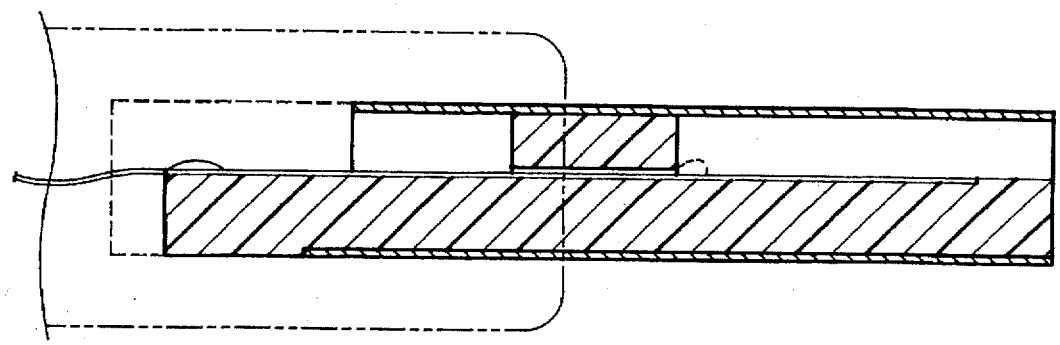
FIG. 2 is a sectional view taken along line II—II of FIG. 1.
Figure 4:
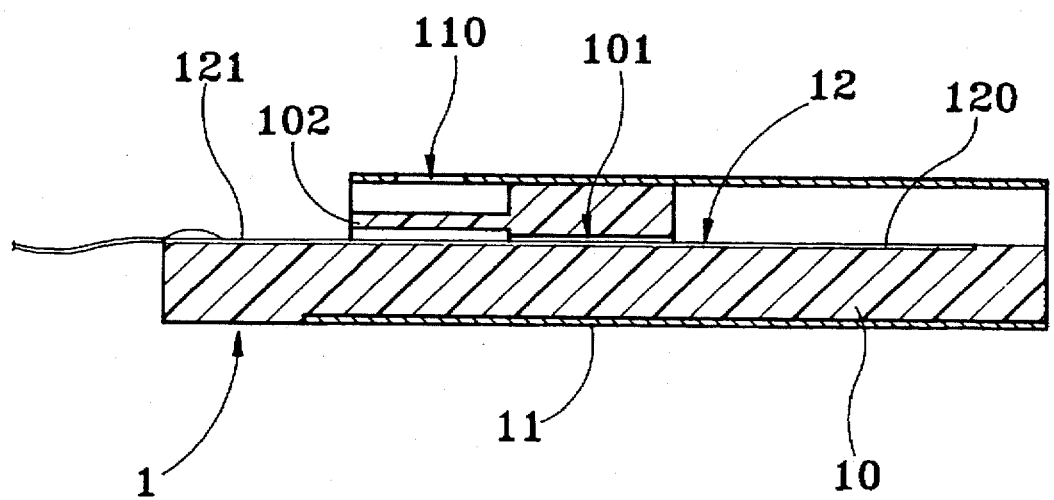
FIG. 4 is a sectional view taken along line IV—IV of FIG. 3.
Figure 5:
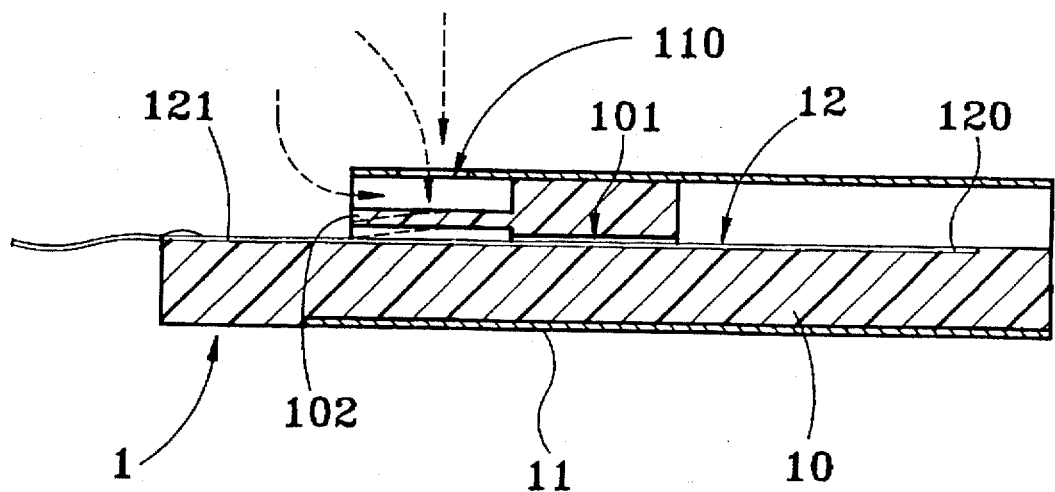
FIG. 5 is similar to FIG. 4 but showing the flexible projecting strips deformed and covered on the terminals over the terminal insertion holes.
Figure 6:
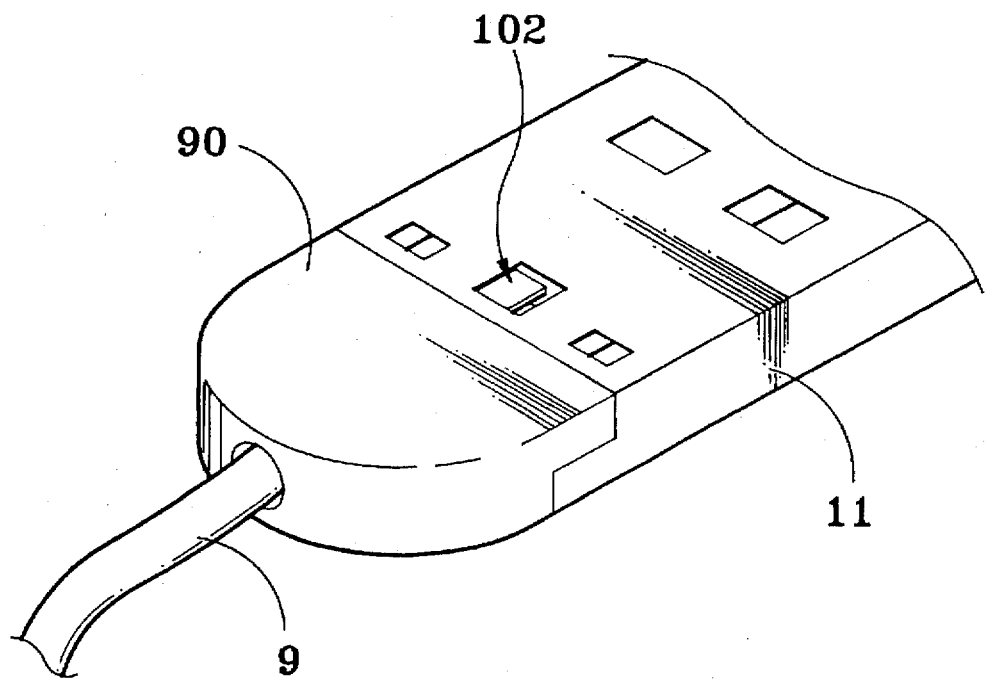
FIG. 6 is an elevational view of the electrical connector shown in FIG. 3.

Referring to FIGS. 4, 5, and 6, when the terminals 12, 12' are respectively inserted into the terminal insertion holes 101, gaps exist in the terminal insertion holes 101 around the terminals 12. 12' (see FIG. 4); when a sealing plastic resin fluid is filled into the filling holes 110, the flexible projecting strips 101 are heated to deform and to closely cover over the terminals 12, 12' (see the dotted line shown in FIG. 5), and therefore the sealing plastic resin fluid is prohibited from passing through the terminal insertion holes 101 toward the coupling portions 120 of the terminals 12, 12'.

Referring to FIG. 6, a packing plastic 90 is molded on the base frame 10 in flush with the metal cover shell 11, and covered over one end of the cable 9 to hold down the terminals.

While only one embodiment of the present invention has been shown and described, it will be understood that various modifications and changes could be made without departing from the spirit and scope of the invention disclosed.

I claim:

1. An electrical connector of the type comprising a plastic base frame having a plurality of terminal insertion holes, a plurality of terminals respectively inserted into said terminal insertion holes, each terminal being mounted in said base frame and respectively welded to a cable, a metal cover shell covering said base frame, and a packing plastic molded on said base frame flush with said metal cover shell, covering said terminals and one end of said cable, wherein said base frame comprises a plurality of flexible projecting strips, each respectively extending from a portion of the periphery of one of said insertion holes and parallel to said cable, said flexible projecting strips being deformed by heat to block up one end of said insertion holes and embed with the packing plastic during the molding of said packing plastic.

2. The electrical connector of claim 1 wherein said metal cover shell has a plurality of filling holes corresponding to said flexible projecting strips for allowing filling of molten packing plastic.

* * * * *